United States Patent Office
2,780,625
Patented Feb. 5, 1957

2,780,625

PIPERAZINE DERIVATIVES AND METHOD OF PREPARING THE SAME

Frederick L. Bach, Jr., Pearl River, and Samuel Kushner, Nanuet, N. Y., assignors to American Cyanamid Company, New York, N. Y., a corporation of Maine No Drawing. Application August 17, 1954, Serial No. 450,522

12 Claims. (Cl. 260—268)

This invention relates to new piperazine carboxylic acids. More particularly, it relates to 2-piperazidecarboxylic acid, derivatives thereof and methods of preparing the same.

The present application is a continuation-in-part of our copending application, Serial Number 292,378, filed June 7, 1952, now abandoned.

It is well known in the prior art that piperazine may be directly alkylated to produce mixtures of 1-substituted and 1,4-disubstituted mono- and di-alkyl piperazines. Also, 1-monosubstituted alkyl piperazines can be obtained by ring closure as disclosed in United States Patent 2,525,223. The preparation of C-substituted piperazines such as 2-piperazinecarboxylic acid has not been disclosed in the prior art. The compounds, because of the fact that the carboxy group is an active group, can be converted into a number of derivatives of physiologically active compounds such as Hetrazan (1-methyl-4-diethylcarbamylpiperazine). The Hetrazan derivative would be 1-methyl-2-carboxy-4-diethylcarbamylpiperazine and can be prepared by reacting 2-piperazinecarboxylic acid with diethyl carbamyl chloride and subsequently with formaldehyde under reductive conditions. 2-piperazinecarboxylic acid salts have parasiticidal properties in that they have the ability to eliminate oxyurids (pinworms) from infested animals. Because of this they exhibit possibilities as pharmacologically active compounds for this purpose. The compounds of the present invention can be represented by the following general formula:

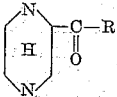

in which R is hydroxyl, lower alkoxy, amino, hydrazino or acid salts thereof.

They can be prepared by reacting an alpha,beta-dihalopropionic acid ester with an alkali metal salt of N,N'-di-para-tosyl ethylenediamine in a solvent. The reaction product thereof is then treated with a mineral acid to obtain the acid salt of 2-piperazinecarboxylic acid and if desired, the salt may be converted to the 2-piperazinecarboxylic acid. The esters, amides and hydrazides can be prepared in the usual manner from the acid.

The compounds of the present invention are, in general, white crystalline solids. They have relatively high melting points with the exception of the esters and, in general, are soluble in the ordinary organic solvents, however, 2-piperazinecarboxylic acid is very soluble in water and only slightly soluble in ordinary organic solvents.

In preparing the compounds of the present invention an ester of an alpha,beta-dihalopropionic acid is heated with an alkali metal salt of N,N'-di-para-tosyl ethylenediamine in a solvent such as the alcohols, ethanol, methanol, propanol, butanol, and the like. In the process dioxane and similar water miscible solvents can also be used. The reaction mixture is usually heated at the refluxing temperature of the solvent for a period of from 30 minutes to about 5 hours. In general, the reaction may take place at a temperature of from 50° C. to about 125° C. The product of the initial reaction is an ester of 1,4-di-para-tosyl-2-piperazinecarboxylic acid. When this product is heated with a mineral acid such as hydrobromic acid, hydrochloric acid, etc., the 1,4-di-para-tosyl radicals are removed and an acid addition salt is formed. This reaction will usually take place on heating the ester of 1,4-di-para-tosyl-2-piperazinecarboxylic acid with a mineral acid at refluxing temperatures for from one to four hours. On cooling the reaction mixture, the product, a salt of 2-piperazinecarboxylic acid, crystallizes out and can be recovered by filtration. The product may be further purified by recrystallization from aqueous alcohol solution.

When the 2-piperazinecarboxylic acid is desired it may be obtained by reacting the salts of the various mineral acids in an aqueous solution with silver carbonate. The inorganic material is separated by filtration and the silver ions present in the filtrate precipitated using hydrogen sulfide. The silver sulfide is then removed by filtration and the filtrate evaporated to give the desired 2-piperazinecarboxylic acid. Ion exchange resins may also be used to convert the acid addition salts of 2-piperazinecarboxylic acid to the (free) acid. The esters of 2-piperazinecarboxylic acid can be prepared by esterification with lower aliphatic alcohols. The amide and hydrazide of 2-piperazinecarboxylic acid can be prepared by treating the esters of 2-piperazinecarboxylic acid with ammonia and hydrazine respectively.

The invention will be described in greater detail in the following specific examples showing the preparation of 2-piperazinecarboxylic acid and representative derivatives thereof.

Example 1

A mixture consisting of 1300 g. of ethyl-alpha,beta-dibromopropionate, 192 g. of potassium hydroxide, 1750 ml. of ethanol and 1600 g. of the sodium salt of N,N'-di-para-tosyl ethylenediamine was heated under reflux for three hours. This ethanolic solution was filtered hot and on standing deposited a crystalline mass which weighed 814.0 g. A sample of this material, 1,4-di-para-tosyl-2-carbethoxypiperazine, was recrystallized from ethyl acetate and melted at 140°–141° C.

Eight hundred grams of 1,4-di-para-tosyl-2-carbethoxypiperazine was refluxed with 7.5 laters of 47.5% hydrobromic acid for three hours. After the first hour the solution became clear and after three hours a crystalline material formed in the solution. On standing the acidic solution deposited 426.0 g. of material which was collected, washed with two 1.0 liter portions of acetone and air-dried. A sample of the dihydrobromide of 2-piperazinecarboxylic acid was recrystallized from a water-acetone solution and the analytical sample sintered at 275° C. and melted with decomposition at 282°–284° C.

Example 2

To a solution consisting of 280 g. of the dihydrobromide of 2-piperazinecarboxylic acid in 1200 ml. of water was added portionwise with stirring 259 g. of silver carbonate. When the precipitation of silver bromide was complete the precipitate was removed, the solution treated with hydrogen sulfide and then filtered to remove any metal sulfides present. The clear, aqueous solution of the free acid was concentrated to dryness and the white, granular solid obtained in this manner weighed 110 g. An analytical sample of this material which was obtained by sublimation sintered at 269° C. and melted with decomposition at 275°–276° C.

Example 3

Thirteen grams of 2-piperazinecarboxylic acid was treated with 10 ml. of concentrated hydrochloric acid. The resulting crystalline mass was cooled to room temperature, filtered and washed with acetone. A yield of 18 g. was obtained and the dihydrochloride of 2-piperazinecarboxylic acid was found to sinter at 259° C. and melt at 261°–262° C. with decomposition.

*Example 4*

2-Piperazinecarboxylic acid (26 g.) was treated with 20 ml. of concentrated sulfuric acid and the crystalline material obtained in this manner was collected, washed with acetone and air-dried. The sulfate salt of 2-piperazinecarboxylic acid weighed 36 g. and melted with decomposition at 254°–255° C.

*Example 5*

A mixture consisting of 70.0 ml. of absolute ethanol, 10.0 ml. of benzene, 2.0 ml. of concentrated sulfuric acid and 11.7 g. of 2-piperazinecarboxylic acid dihydrobromide was refluxed for sixty hours. After this period of time the reflux condenser was replaced by a heated, packed, distillation column and an azeotropic mixture of benzene, ethanol and water distilling at 64.9° C./760 mm. was collected. When the temperature at the still-head rose above 64.9° C. distillation was discontinued and the mixture was refluxed an additional five hours. The portion boiling at 64.9° C. was then collected and this procedure was repeated until a constant boiling point of 78°–79° C./760 mm. was maintained. After the distillation process was completed the reaction mixture was concentrated under reduced pressure at steam-cone temperature. The residual material was cooled to 0°–5° C., made slightly alkaline with cold, concentrated potassium carbonate solution and extracted with three 50 ml. portions of dry benzene. The combined extracts were concentrated to a yellow, oily residue which weighed 3.5 g. This crude yield solidified on standing and after two recrystallizations from warm ether, the 2-carbethoxypiperazine melted at 62°–64° C.

*Example 6*

Ten grams of 2-carbethoxypiperazine was dissolved in 100 ml. of ethanol and this solution was treated with 50 ml. of concentrated ammonium hydroxide. The ammoniacal solution was allowed to stand approximately seventy hours at room temperature and was then concentrated to a gummy residue which crystallized when triturated with an ethanol-ether solution. After recrystallization from warm ethanol, the 2-piperazinecarboxamide melted at 144°–145° C.

*Example 7*

A solution consisting of 4.0 g. of 2-carbethoxypiperazine in 50 ml. of dry ethanol was brought to reflux and then treated with 5.0 ml. of hydrazine hydrate (100%) which was added dropwise over a period of thirty minutes. After the last addition of hydrazine hydrate, the reaction mixture was refluxed for one hour and then concentrated under reduced pressure to a gummy residue. This crude material which crystallized when triturated with two 20 ml. portions of ether was collected and recrystallized from warm benzene. The pure 2-piperazinecarbohydrazide obtained in this manner melted at 100°–101° C.

*Example 8*

A mixture consisting of 4.0 g. of ethyl-alpha,beta-dibromopropionate, 5.0 g. of the sodium salt of N,N'-di-para-tosyl ethylenediamine and 0.6 g. of potassium hydroxide in 50 ml. of ethanol was refluxed for three hours using an open, glass tube, 90 cm. long, as a condenser. To the resulting brown-colored solution and granular precipitate was added 75 ml. of water and the mixture was allowed to stand overnight at room temperature. The solid material remaining was filtered and triturated with two 50 ml. portions of water and two 50 ml. portions of 12% sodium hydroxide solution. After trituration the granular product remaining was recrystallized from ethyl acetate and was N,N'-di-para-tosyl-2-piperazinecarboxylic acid, ethyl ester, melting at 140°–141° C.

A mixture of 8.0 g. of the ethyl ester prepared above and 75 mls. of 47.5% hydrobromic acid was refluxed for three hours. After about one hour, the piperazine derivative completely dissolved in the hydrobromic acid and then recrystallized from the solution after three hours of refluxing. The solution was allowed to cool to room temperature, the crystalline mass was collected, washed with dry acetone, and air-dried. The crude material was recrystallized from water-ethanol solution and amounted to 96% of the theoretical yield of 2-piperazinecarboxylic acid dihydrobromide.

*Example 9*

Seven grams of the dihydrobromide prepared in Example 8 was dissolved in 25 ml. of water and to this solution was added portionwise with stirring, 6.67 g. of silver carbonate. After the precipitation of silver bromide was complete, the solid material was filtered off and the clear aqueous solution was freed of silver ions by means of hydrogen sulphide. After any silver sulphide present was removed by filtration, the aqueous solution of the piperazinecarboxylic acid was evaporated to dryness under reduced pressure, and the white, crystalline product remaining weighed 2.9 g. The free acid was not soluble in the ordinary organic solvents, so an analytical sample was obtained by means of sublimation and had a melting point of 270°–271° C. with sintering at 268° C.

*Example 10*

A mixture consisting of 70.0 ml. absolute ethanol, 10.0 ml. benzene, 2.0 ml. of concentrated sulphuric acid and 11.7 g. (0.04 mole) piperazine-2-carboxylic acid dihydrobromide was refluxed approximately sixty hours and after this period of time the volatile material was fractionated using a heated, packed-column. The ternary azeotropic mixture (benzene, alcohol and water) was collected at 64.9° C./1 atm. until the temperature of the boiling material began to rise. At this point distillation was discontinued and the reaction mixture was allowed to reflux an additional five hours. The portion boiling at 64.9° C./1 atm. was then removed until a constant temperature 78°–79° C./1 atm. was maintained. The solvents were then distilled under reduced pressure and the semi-crystalline, acidic residue was cooled to 0°–5° C. The chilled residual mass was neutralized with cold, concentrated potassium carbonate solution and then extracted with three 50 ml. portions of ether. The combined extracts were dried over anhydrous magnesium sulfate, concentrated to dryness and the low-melting needles remaining were collected, recrystallized from warm ether and melted at 62°–64° C. The product is ethyl ester of 2-piperazinecarboxylic acid.

*Example 11*

The ethyl ester of 2-piperazinecarboxylic acid (2.0 g., 0.01 mole) was dissolved in 50 ml. of ethanol and to this solution was added 25 ml. of concentrated ammonium hydroxide. The ammoniacal solution was allowed to stand seventy hours at room temperature and was then concentrated to a gummy residue. The crude material obtained in this mannr was triturated with dry benzene and then crystallization was induced by treating the material with an ethanol-ether solution. After recrystallization from ethanol the compound 2-piperazinecarboxamide melted at 144°–145° C.

*Example 12*

The ethyl ester of 2-piperazinecarboxylic acid (0.8 g., 0.005 mole) was refluxed fifteen hours with 10 ml. of dry ethanol and 1.0 ml. hydrazine hydrate (100%). The resulting solution was concentrated to a gummy residue which crystallized when triturated with two 10 ml. portions of ether. After two recrystallizations from warm benzene the melting point of the crystalline material, 2-piperazinecarbohydrazide, remained constant at 100°–101.5° C.

We claim:

1. Compounds of the group having the general formula:

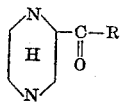

in which R is a member of the group consisting of hydroxyl, lower alkoxy, amino, hydrazino and acid salts threof.

2. Lower alkyl 2-piperazine carboxylates.
3. 2-Piperazinecarboxylic acid.
4. Ethyl ester of 2-piperazinecarboxylic acid.
5. 2-Piperazinecarboxamide.
6. 2-Piperazinecarboxhydrazide.
7. 2-Piperazinecarboxylic acid dihydrobromide.

8. A method of preparing a member of the group consisting of 2-piperazinecarboxylic acid and therapeutically useful acid salts thereof which comprises reacting an alkyl ester of an alpha,beta-dibromopropionic acid with an alkali metal salt of N,N'-di-para-tosyl ethylenediamine, treating the reaction product thereof with an acid and recovering said compound therefrom.

9. A method of preparing 2-piperazinecarboxylic acid which comprises reacting an alkyl ester of an alpha, beta-dibromopropionic acid with an alkali metal salt of N,N'-di-para-tosyl ethylenediamine, heating the reaction product thereof with an acid to form the corresponding acid salt, and neutralizing said acid salt to yield 2-piperazinecarboxylic acid and recovering said compound therefrom.

10. A method of preparing therapeutically useful acid salt of 2-piperazine-carboxylic acid which comprises reacting an alkyl ester of an alpha,-beta-dibromopropionic acid with an alkali metal salt of N,N'-di-paratosyl ethylenediamine, heating the raction product threof with an acid and recovering said salt therefrom.

11. In a method of preparing 2-piperazinecarboxylic acid the step which comprises neutralizing the acid salt of 2-carboxypiperazine acid.

12. A method of preparing 2-piperazinecarboxylic acid dihydrobromide which comprises reacting an alkyl ester of an alpha,-beta-dihalopropionic acid with an alkali metal salt of N,N'-di-paratosyl ethylenediamine, heating the reaction product thereof with hydrobromic acid and recovering said salt therefrom.

References Cited in the file of this patent

UNITED STATES PATENTS 2,472,496  Stewart _____ June 7, 1949

OTHER REFERENCES

Rosdalsky: J. Pr. Chem. 2, 53, 24 (1896).